US011018926B2

(12) United States Patent
Agarwal et al.

(10) Patent No.: US 11,018,926 B2
(45) Date of Patent: May 25, 2021

(54) REDUNDANT LAYER 2 DOMAIN INTERCONNECTION

(71) Applicant: Cisco Technology, Inc., San Jose, CA (US)

(72) Inventors: Shruti Agarwal, Milpitas, CA (US); Su Xia, Union City, CA (US); Parixit Gokhale, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 128 days.

(21) Appl. No.: 15/896,112

(22) Filed: Feb. 14, 2018

(65) Prior Publication Data

US 2019/0253304 A1 Aug. 15, 2019

(51) Int. Cl.
| | |
|---|---|
| *G06F 15/16* | (2006.01) |
| *H04L 29/06* | (2006.01) |
| *H04L 29/08* | (2006.01) |
| *H04L 12/751* | (2013.01) |
| *H04L 12/46* | (2006.01) |

(52) U.S. Cl.
CPC .... *H04L 29/06088* (2013.01); *H04L 12/4675* (2013.01); *H04L 29/06476* (2013.01); *H04L 29/08576* (2013.01); *H04L 45/026* (2013.01); *H04L 67/14* (2013.01); *H04L 69/08* (2013.01); *H04L 69/14* (2013.01)

(58) Field of Classification Search
CPC ................................................ H04L 29/06088
USPC ....................................................... 709/225
See application file for complete search history.

(56) References Cited

U.S. PATENT DOCUMENTS

| | | | | |
|---|---|---|---|---|
| 8,705,526 B1* | 4/2014 | Hasan | ................. | H04L 12/4633 370/216 |
| 2007/0008982 A1* | 1/2007 | Voit | ...................... | H04L 12/462 370/401 |
| 2010/0177644 A1* | 7/2010 | Kucharczyk | ........ | H04L 41/0681 370/250 |
| 2010/0274898 A1* | 10/2010 | Zuver | ..................... | H04L 45/00 709/226 |
| 2011/0103220 A1* | 5/2011 | Haq | ......................... | H04L 1/22 370/216 |

(Continued)

*Primary Examiner* — Hamza N Algibhah
(74) *Attorney, Agent, or Firm* — Merchant & Gould P.C.

(57) ABSTRACT

Redundant Layer 2 Domain Interconnection may be provided. First, a first device in a first domain may be designated as an active device in response to the first device in the first domain negotiating with a second device in the first domain. The first device in the first domain may be connected to a first device in a second domain. The first domain may use a first protocol and the second domain may use a second protocol. Next, the first device in the first domain in response to being designated as the active device, may allow data traffic to pass between the first device in the first domain and the first device in the second domain. Then the second device in the first domain may be designated as a standby device in response to the first device in the first domain negotiating with the second device in the first domain. The second device in the first domain may be connected to a second device in the second domain. The second device in the first domain, in response to being designated as the standby device, may then block data traffic between the second device in the first domain and the second device in the second domain.

20 Claims, 4 Drawing Sheets

(56) References Cited

U.S. PATENT DOCUMENTS

| | | | |
|---|---|---|---|
| 2015/0092536 A1* | 4/2015 | Mohan | H04L 12/462 370/218 |
| 2016/0197821 A1* | 7/2016 | Hao | H04L 45/28 370/248 |
| 2016/0254984 A1* | 9/2016 | Tekalp | H04L 45/02 709/242 |
| 2019/0089627 A1* | 3/2019 | Mirsky | H04L 45/245 |

* cited by examiner

REDUNDANT LAYER 2 DOMAIN INTERCONNECTION

TECHNICAL FIELD

The present disclosure relates generally to Layer 2 network domain interconnection.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, switch, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
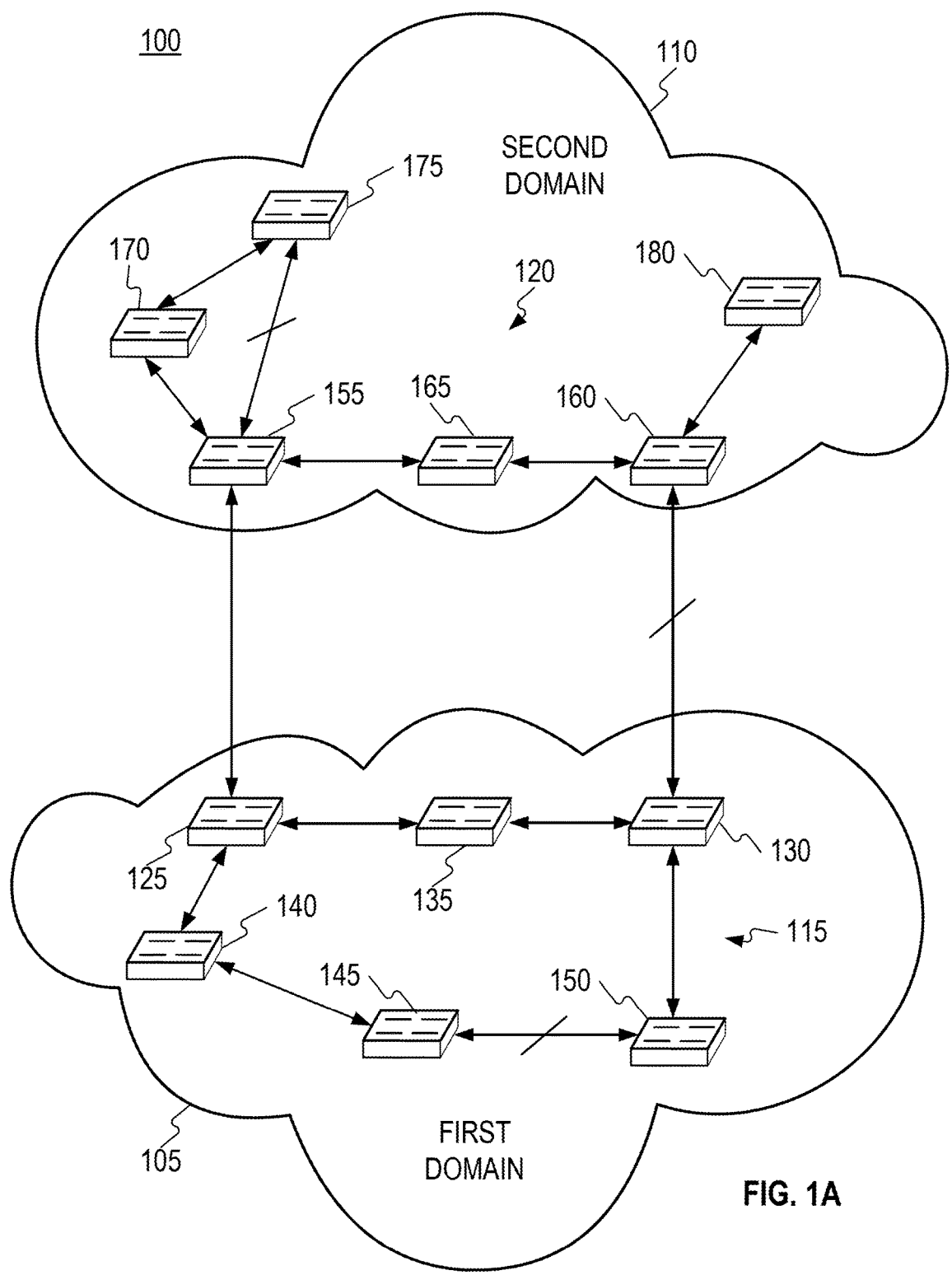
FIG. 1A is a block diagram of an operating environment for providing Redundant Layer 2 Domain Interconnection.

Redundant Layer 2 Domain Interconnection may be provided. First, a first device in a first domain may be designated as an active device in response to the first device in the first domain negotiating with a second device in the first domain. The first device in the first domain may be connected to a first device in a second domain. The first domain may use a first protocol and the second domain may use a second protocol. Next, the first device in the first domain in response to being designated as the active device, may allow data traffic to pass between the first device in the first domain and the first device in the second domain. Then the second device in the first domain may be designated as a standby device in response to the first device in the first domain negotiating with the second device in the first domain. The second device in the first domain may be connected to a second device in the second domain. The second device in the first domain, in response to being designated as the standby device, may then block data traffic between the second device in the first domain and the second device in the second domain.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The Open Systems Interconnection (OSI) model may be used in communicating data over networks. The OSI model may comprise several layers including Layer 1, Layer 2, and Layer 3. Layer 1 may provide services to transmit bits or groups of bits over a transmission link between open systems and which entails electrical, mechanical, and handshaking procedures. Layer 2 may comprise the data link layer and may provide node-to-node data transfer. Layer 3 may comprise the network layer and may provide the functional and procedural means of transferring variable length data sequences (i.e., datagrams) from one node to another.

While networks may use the OSI model, there may be no single protocol that allows a user to connect any two disparate Layer 2 networks at multiple points without running into a loop. For example, a Resilient Ethernet Protocol (REP) ring and a Spanning Tree Protocol (STP) network may not be connected at more than two points. This may create a problem for users who may want to connect their Operational Technology (OT) side devices in a redundant topology (e.g., a Device Level Ring (DLR) ring, a Media Redundancy Protocol (MRP) ring etc.) and have multiple gateway connections between the IT and OT networks.

Embodiments of the disclosure may provide a Redundant Layer 2 Domain Interconnection (RLDI) that may overcome the aforementioned problems with connecting multiple disparate Layer 2 networks. For example, embodiments of the disclosure may provide a solution that may allow a node in a Layer 2 network to act as a gateway to connect to another Layer 2 network where the two networks use different Layer 2 protocols. Consequently, embodiments of the disclosure may allow two or more RLDI capable devices to provide redundant gateway connections between disparate Layer 2 networks (i.e., domains). The RLDI devices may negotiate with each other using multicast control frames to determine which RLDI device may act as an active gateway when a new RLDI device becomes available or when the active RLDI device goes down (e.g., malfunctions or loses its connection).

FIG. 1A is a block diagram of an operating environment 100 for providing Redundant Layer 2 Domain Interconnection consistent with embodiments of the disclosure. As shown in FIG. 1A, operating environment 100 may comprise a first domain 105 and a second domain 110. First domain 105 may use a first protocol and second domain 110 may use a second protocol. The first protocol may comprise, but is not limited to, Spanning Tree Protocol (STP), Device Level Ring (DLR), Media Redundancy Protocol (MRP), and Resilient Ethernet Protocol (REP). Similarly, the second protocol may comprise, but is not limited to, STP, DLR, MRP, and REP.

First domain 105 may comprise a first plurality of devices 115 in first domain 105 and second domain 110 may comprise a second plurality of devices 120 in second domain 110. First plurality of devices 115 in first domain 105 may comprise a first device 125, a second device 130, a third device 135, a fourth device 140, a fifth device 145, and a sixth device 150. Each of first plurality of devices 115 in first domain 105 may comprise, but are not limited to, a host, a router, or a switch. As shown in FIG. 1A, first plurality of devices 115 may be connected by links that carry data traffic between first plurality of devices 115. For example, first device 125 and second device 130 may be connected in first domain 105 with data traffic passing through third device 135 for example.

Similarly, second plurality of devices 120 in second domain 110 may comprise a first device 155, a second device 160, a third device 165, a fourth device 170, a fifth device 175, and a sixth device 180. Each of second plurality of devices 120 in second domain 110 may comprise, but are not limited to, a host, a router, or a switch. As shown in FIG. 1A, second plurality of devices 120 may be connected by links that carry Layer 2 data traffic between second plurality of devices 120. For example, first device 155 and second device 160 may be connected in second domain 110 with data traffic passing through third device 165 for example.

First domain 105 and second domain 110 may be connected. For example, first device 125 in first domain 105 may be connected to first device 155 in second domain 110 by a link that carries Layer 2 data traffic between first device 125 in first domain 105 and first device 155 in second domain 110. Similarly, second device 130 in first domain 105 may be connected to second device 160 in second domain 110 by a link that carries Layer 2 data traffic between second device 130 in first domain 105 and second device 160 in second domain 110.

Figure 1B:
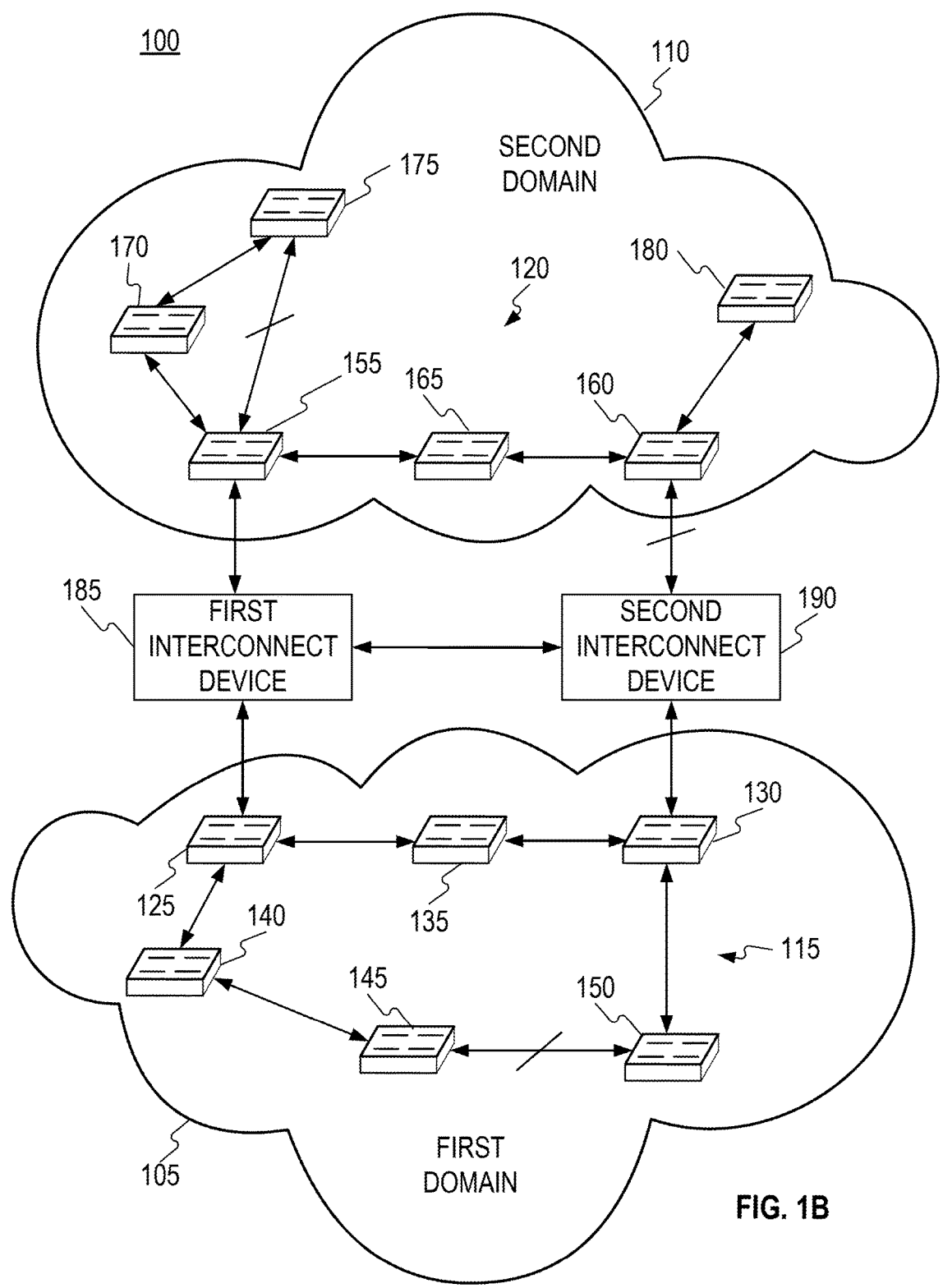
FIG. 1B is a block diagram of an operating environment for providing Redundant Layer 2 Domain Interconnection.

FIG. 1B is a block diagram of operating environment 100 for providing Redundant Layer 2 Domain Interconnection. FIG. 1B shows an embodiment of the disclosure in which a first interconnection device 185 may be disposed between first device 125 of first domain 105 and first device 155 of second domain 110. Also, as shown in FIG. 1B, a second interconnection device 190 may be disposed between second device 130 of first domain 105 and second device 160 of second domain 110. Embodiments of the disclosure in FIG. 1B may be implemented, for example, because software on the devices in first domain 105 or second domain 110 may not be changed to implement RLDI because a system operator may not want it or because of device limitations.

Figure 2:
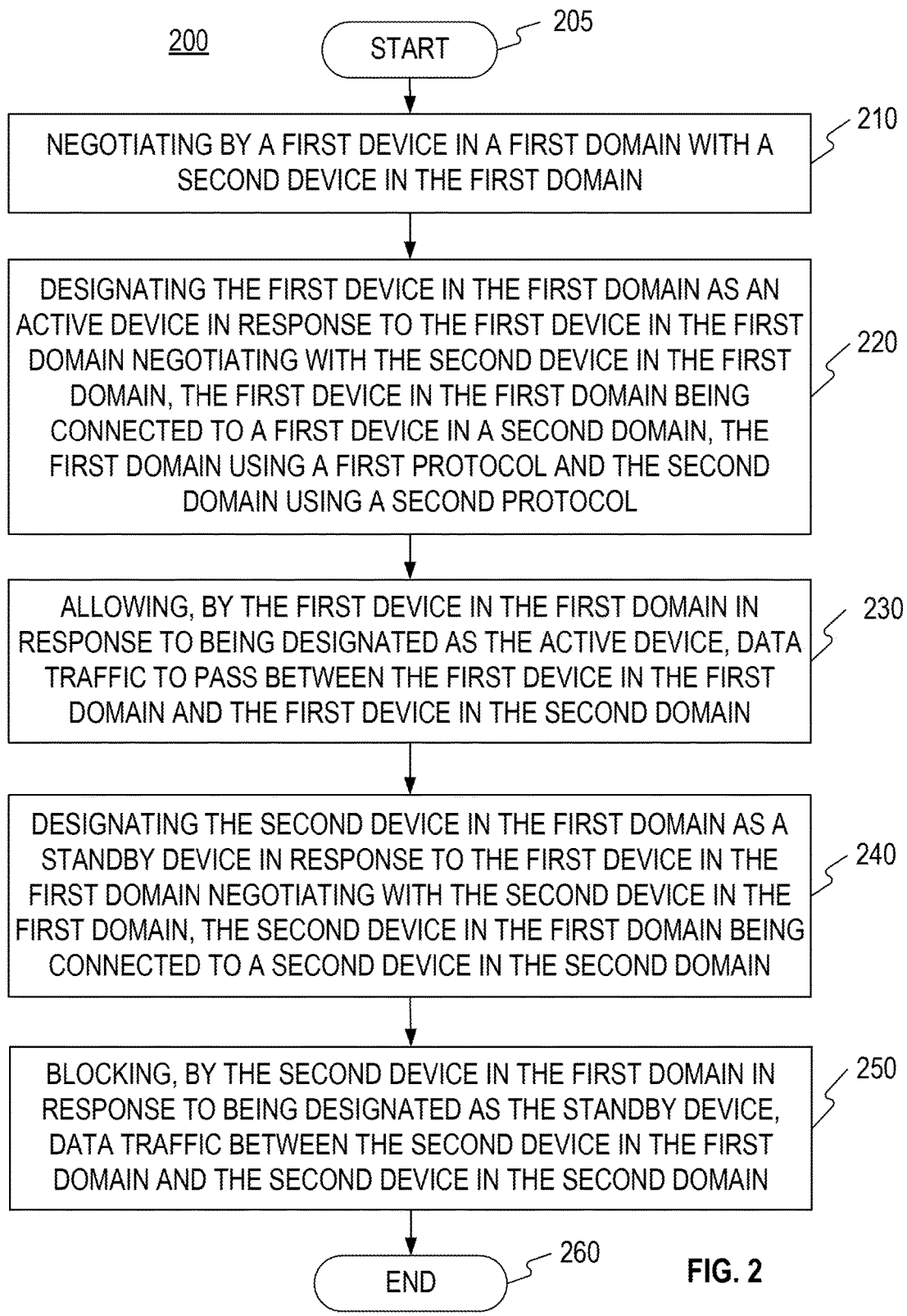
FIG. 2 is a flow chart of a method for providing Redundant Layer 2 Domain Interconnection.

FIG. 2 is a flow chart setting forth the general stages involved in a method 200 consistent with an embodiment of the disclosure for providing Redundant Layer 2 Domain Interconnection. Method 200 may be implemented using first device 125 of first domain 105 and second device 130 of first domain 105 as described in more detail above with respect to FIG. 1A. A computing device 300 may provide an operating environment for first device 125 of first domain 105 and second device 130 of first domain 105 as described in more detail below with respect to FIG. 3. Ways to implement the stages of method 200 will be described in greater detail below.

Method 200 may begin at starting block 205 and proceed to stage 210 where first device 125 in first domain 105 may negotiate with second device 130 in first domain 105. For example, one or more of plurality of devices 115 may be enabled as Redundant Layer 2 Domain Interconnection (RLDI) devices via remote programming or a technician may perform the enablement directly on the devices. First device 125 in first domain 105 and second device 130 in first domain 105 may be enabled as RLDI devices because they may be the devices on the edge of first domain 105 that connect with second domain 110.

When first device 125 in first domain 105 and second device 130 in first domain 105 are enabled as RLDI devices, they may be given a priority. The priority may comprise a value assigned to the device to indicate the device's priority. A higher value may indicate a higher priority. If no priority is configured on the device, then the priority may comprise a Media Access Control (MAC) address of the corresponding device. For example, a device with a higher MAC address may have a higher priority than a device with a lower MAC address.

Because first device 125 in first domain 105 and second device 130 in first domain 105 may be enabled as RLDI devices, they may negotiate with one another over links that carry Layer 2 data traffic between first device 125 in first domain 105 and second device 130 in first domain 105 to see which of these devices may be the active device in first domain 105 and which may be the standby device in domain 105. Devices (e.g., first device 125 in first domain 105 and second device 130 in first domain 105) may go into a negotiating state after they have been RLDI enabled. While in the negotiating state, the devices may send out hello packets to make other RLDI devices aware of their existence and also listen for hello packets from other RLDI devices. The hello packets may include the aforementioned priority of the device sending the hello packet.

The devices may negotiate (i.e., be in the negotiating state) for a fixed period of time (i.e., a wait period). The wait period may comprise a period of time for an RLDI device to listen for hello packets from other RLDI devices. For example, the wait period may be set to three times a hello timeout, which may comprise a period of time after which an active RLDI device may no longer negotiate. A hello interval may comprise a time gap between successive hello packets (e.g., 5 ms).

If during the fixed period (i.e., wait period) a device does not receive any hello packets from any other devices or if it receives hello packets from other devices that have a lower priority than this device, then it may transition to an active state. A device that transitions to the active state may become a device designated as an active device. While in the active state, the device may act as a conduit between two networks (i.e., domains). It may also continue transmitting hello packets while in the active state.

Furthermore, a device may go into a standby state if it receives hello packets from an RLDI device with a higher priority during the wait period. A device that transitions to the standby state may become a device designated as a standby device. While in the standby state, the standby device may not carry any data traffic from one network (i.e., domain) to the other, thus preventing, for example, a loop between the two disparate Layer 2 networks (i.e., first domain 105 and second domain 110). It may not send any hello packets while in the standby state. If a device is in the standby state and it receives a hello packet from an active device with the state set to down or if it does not receive any hello packets from the active device during the hello timeout period, it may transition to the negotiating state. A device may go to a down state if the device itself powers down, crashes, or if its gateway links go down. When a device transitions to the down state, it may send out multiple (e.g., 3) hello packets to inform other devices of its state if possible.

From stage 210, where first device 125 in first domain 105 negotiates with second device 130 in first domain 105, method 200 may advance to stage 220 where first device 125 in first domain 105 may designate first device 125 in first domain 105 as an active device in response to first device 125 in first domain 105 negotiating with second device 130 in first domain 105. First device 125 in first domain 105 may be connected to first device 155 in second domain 110. First domain 105 may use a first protocol and second domain 110 may use a second protocol. For example, first device 125 in first domain 105 and second device 130 in first domain 105 may go into a negotiating state for a wait period after they have been RLDI enabled. If during the wait period, first device 125 in first domain 105 receives a hello packet from second device 130 in first domain 105 that may indicate a lower priority than first device 125 in first domain 105 device, then first device 125 in first domain 105 may transition to the active state and designate itself as the active device.

Once first device 125 in first domain 105 designates first device 125 in first domain 105 as the active device in stage 220, method 200 may continue to stage 230 where first device 125 in first domain 105 may allow, in response to being designated as the active device, Layer 2 data traffic to pass over the link between first device 125 in first domain 105 and first device 155 in second domain 110. For example, while in the active state, first device 125 in first domain 105 may act as a conduit between first domain 105 and second domain 110. First device 125 in first domain 105 may also continue transmitting hello packets while in the active state.

After first device 125 in first domain 105 allows data traffic to pass between first device 125 in first domain 105 and first device 155 in second domain 110 in stage 230, method 200 may proceed to stage 240 where second device 130 in first domain 105 may designate second device 130 in first domain 105 as a standby device in response to first device 125 in first domain 105 negotiating with second device 130 in first domain 105. Second device 130 in first domain 105 may be connected to second device 160 in second domain 110. For example, if during the wait period, second device 130 in first domain 105 receives a hello packet from first device 125 in first domain 105 that may indicate a higher priority than second device 130 in first domain 105 device, then second device 130 in first domain 105 may transition to the standby state and designate itself as the standby device.

From stage 240, where second device 130 in first domain 105 designates second device 130 in first domain 105 as the standby device, method 200 may advance to stage 250 where second device 130 in first domain 105 may block, in response to being designated as the standby device, Layer 2 data traffic from passing over the link between second device 130 in first domain 105 and second device 160 in second domain 110. For example, while in the standby state, second device 130 in first domain 105 may not carry any data traffic between first domain 105 and second domain 110. In addition, second device 130 in first domain 105 may not send any hello packets either while in the standby state. Once second device 130 in first domain 105 blocks data traffic between second device 130 in first domain 105 and second device 160 in second domain 110 in stage 250, method 200 may then end at stage 260.

Consistent with embodiments of the disclosure, as shown in FIG. 1B, first interconnection device 185 and second interconnection device 190 may be placed at the interconnection points between first domain 105 and second domain 110 and enabled as RLDI devices. First interconnection device 185 and second interconnection device 190 may be employed, for example, if first device 125 in first domain 105 and second device 130 in first domain 105 are not capable of being enabled as RLDI devices. Consequently, first interconnection device 185 and second interconnection device 190 may carry out the process described above with respect to method 200 where first interconnection device 185 and second interconnection device 190 may be may be enabled as RLDI devices, first interconnection device 185 may comprise an active device, and second interconnection device 190 may comprise a standby device. First interconnection device 185 and second interconnection device 190 may not be a part of either first domain 105 or second domain 110 and may communicate with each other over a dedicated (e.g., Ethernet) connection.

Embodiments of the disclosure may also provide Virtual Local Area Network (VLAN) load balancing between the RLDI enabled devices. For example, data traffic can be load-distributed across two or more RLDI devices by configuring two RLDI instances on the RLDI devices and assigning a specific range of VLANs to each instance. Accordingly, i) one RLDI device (e.g., first device 125 in first domain 105) may be the active device for a first range of VLANs and the standby device for a second range of VLANs; and ii) another RLDI device (e.g., second device 130 in first domain 105) may be the active device for the second range of VLANs and the standby device for the first range of VLANs. Accordingly, data traffic load may be balance between the two RLDI devices.

Figure 3:
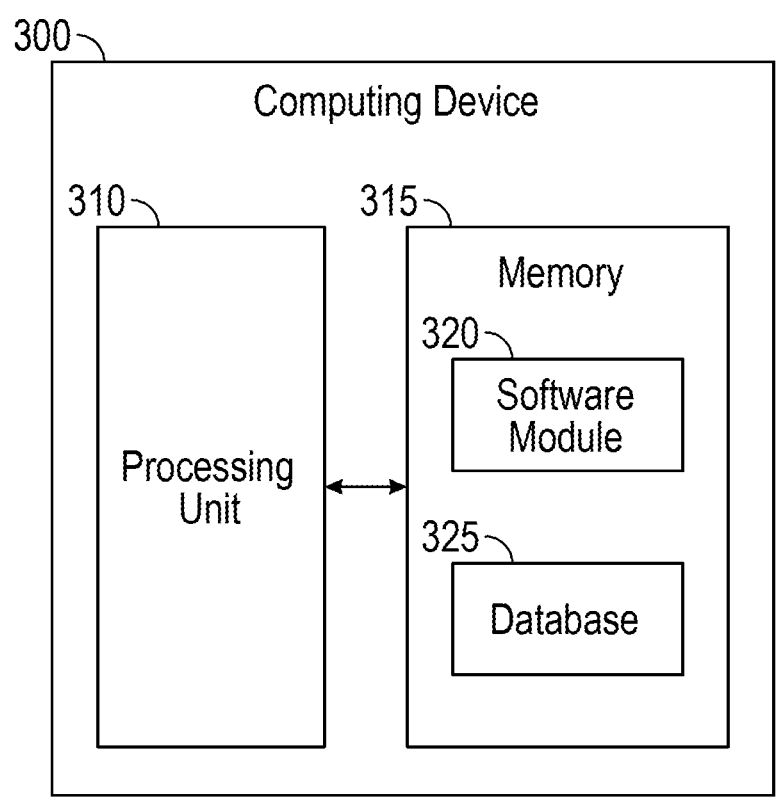
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for providing Redundant Layer 2 Domain Interconnection, including for example, any one or more of the stages from method 200 described above with respect to FIG. 2. Computing device 300 may provide an operating environment for any one or more of plurality of devices 115 in first domain 105, plurality of devices 120 in second domain 110, first interconnection device 185, and second interconnection device 190. Any one or more of plurality of devices 115 in first domain 105, plurality of devices 120 in second domain 110, first interconnection device 185, and second interconnection device 190 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a camera, a load balancer or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   negotiating by a first device in a first domain with a second device in the first domain, wherein negotiating by the first device in the first domain with the second device in the first domain comprises enabling each of the first device in the first domain and the second device in the first domain as Redundant Layer 2 Domain Interconnection devices and exchanging, in response to enabling each of the first device in the first domain and the second device in the first domain as the Redundant Layer 2 Domain Interconnection devices, hello messages between the first device in the first domain and the second device in the first domain;
   designating the first device in the first domain as an active device in response to the first device in the first domain negotiating with the second device in the first domain, the first device in the first domain being connected to a first device in a second domain through a first interconnection link that carries layer 2 data traffic between the first domain and the second domain, the first domain using a first protocol and the second domain using a second protocol different from the first protocol;
   allowing, by the first device in the first domain in response to being designated as the active device, data traffic to pass between the first device in the first domain and the first device in the second domain;
   designating the second device in the first domain as a standby device in response to the first device in the first domain negotiating with the second device in the first domain, the second device in the first domain being connected to a second device in the second domain over a second interconnection link between the first domain and the second domain; and blocking, by the second device in the first domain in response to being designated as the standby device, data traffic between the second device in the first domain and the second device in the second domain over the second link that carries layer 2 data traffic between the first domain and the second domain.

2. The method of claim 1, wherein negotiating by the first device in the first domain with the second device in the first domain comprises:
sending, by the first device in the first domain, a first hello packet to the second device in the first domain; and
receiving, by the first device in the first domain, a second hello packet from the second device in the first domain.

3. The method of claim 2, wherein sending, by the first device in the first domain, the first hello packet to the second device in the first domain comprises sending, by the first device in the first domain, the first hello packet to the second device in the first domain over an interconnection link that carries Layer 2 data traffic between the first device in the first domain and the second device in the first domain.

4. The method of claim 2, wherein receiving, by the first device in the first domain, the second hello packet from the second device in the first domain comprises receiving, by the first device in the first domain, the second hello packet from the second device in the first domain over an interconnection link that carries Layer 2 data traffic between the first device in the first domain and the second device in the first domain.

5. The method of claim 2, wherein designating the first device in the first domain as the active device in response to the first device in the first domain negotiating with the second device in the first domain comprises designating the first device in the first domain as the active device based on the second hello packet indicating that the second device in the first domain has a lower priority than the first device in the first domain.

6. The method of claim 2, wherein designating the second device in the first domain as the standby device in response to the first device in the first domain negotiating with the second device in the first domain comprises designating the second device in the first domain as the standby device based on the first hello packet indicating that the first device in the first domain has a higher priority than the second device in the first domain.

7. The method of claim 1, wherein allowing, by the first device in the first domain in response to being designated as the active device, the data traffic to pass comprises allowing the data traffic to pass wherein the data traffic comprises data traffic correspond to a Virtual Local Area Network (VLAN).

8. The method of claim 1, wherein blocking, by the second device in the first domain in response to being designated as the standby device, the data traffic comprises blocking the data traffic wherein the data traffic comprises data traffic correspond to a Virtual Local Area Network (VLAN).

9. The method of claim 1, wherein using the first protocol comprises using the first protocol comprising a Layer 2 protocol comprising one of the following: Spanning Tree Protocol (STP), Device Level Ring (DLR), Media Redundancy Protocol (MRP), and Resilient Ethernet Protocol (REP).

10. The method of claim 1, wherein using the second protocol comprises using the second protocol comprising a Layer 2 protocol comprising one of the following: Spanning Tree Protocol (STP), Device Level Ring (DLR), Media Redundancy Protocol (MRP), and Resilient Ethernet Protocol (REP).

11. The method of claim 1, wherein negotiating by the first device in the first domain with the second device in the first domain comprises negotiating by the first device in the first domain with the second device in the first domain in response to enabling the first device in the first domain as the Redundant Layer 2 Domain Interconnection device.

12. The method of claim 1, wherein negotiating by the first device in the first domain with the second device in the first domain comprises negotiating by the first device in the first domain with the second device in the first domain in response to enabling the second device in the first domain as the Redundant Layer 2 Domain Interconnection device.

13. A system comprising:
a first device in a first domain; and
a second device in the first domain, the first device in the first domain comprising;
a first memory storage, and
a first processing unit coupled to the first memory storage, wherein the first processing unit is operative to;
negotiate by the first device in the first domain with the second device in the first domain, wherein negotiating by the first device in the first domain with the second device in the first domain comprises enabling each of the first device in the first domain and the second device in the first domain as Redundant Layer 2 Domain Interconnection devices and exchanging, in response to enabling each of the first device in the first domain and the second device in the first domain is as the Redundant Layer 2 Domain Interconnection devices, hello messages between the first device in the first domain and the second device in the first domain;
designate the first device in the first domain as an active device in response to the first device in the first domain negotiating with the second device in the first domain, the first device in the first domain being connected to a first device in a second domain through a first interconnection link that carries layer 2 data traffic between the first domain and the second domain, the first domain using a first protocol and the second domain using a second protocol different from the first protocol, and
allow, by the first device in the first domain in response to being designated as the active device, data traffic to pass between the first device in the first domain and the first device in the second domain; and
the second device in the first domain comprising;
a second memory storage; and
a second processing unit coupled to the second memory storage, wherein the second processing unit is operative to;
designate the second device in the first domain as a standby device in response to the first device in the first domain negotiating with the second device in the first domain, the second device in the first domain being connected to a second device in the second domain over a second interconnection link between the first domain and the second domain, and
block, by the second device in the first domain in response to being designated as the standby device, data traffic between the second device in the first domain and the second device in the second domain over the second interconnection link between the first domain and the second domain.

14. The system of claim 13, wherein the first device in the first domain negotiating with the second device in the first domain comprises the first processing unit being operative to:
   send a first hello packet to the second device in the first domain; and
   receive a second hello packet from the second device in the first domain.

15. The system of claim 14, wherein the first processing unit is operative to designate the first device in the first domain as the active device based on the second hello packet indicating that the second device in the first domain has a lower priority than the first device in the first domain.

16. The system of claim 14, wherein the second processing unit is operative to designate the second device in the first domain as the standby device based on the first hello packet indicating that the first device in the first domain has a higher priority than the second device in the first domain.

17. A computer-readable medium that stores a set of instructions which when executed perform a method executed by the set of instructions comprising:
   negotiating by a first device in a first domain with a second device in the first domain, wherein negotiating by the first device in the first domain with the second device in the first domain comprises enabling each of the first device and the second device is as Redundant Layer 2 Domain Interconnection devices and exchanging, in response to enabling each of the first device and the second device is as Redundant Layer 2 Domain Interconnection devices, hello messages between the first device and the second device;
   designating the first device in the first domain as an active device in response to the first device in the first domain negotiating with the second device in the first domain, the first device in the first domain being connected to a first device in a second domain through a first interconnection link that carries layer 2 data traffic between the first domain and the second domain, the first domain using a first protocol and the second domain using a second protocol different from the first protocol; and
   allowing, by the first device in the first domain in response to being designated as the active device, data traffic to pass between the first device in the first domain and the first device in the second domain.

18. The non-transitory computer-readable medium of claim 17, wherein negotiating by the first device in the first domain with the second device in the first domain comprises:
   sending, by the first device in the first domain, a first hello packet to the second device in the first domain; and
   receiving, by the first device in the first domain, a second hello packet from the second device in the first domain.

19. The non-transitory computer-readable medium of claim 18, wherein sending, by the first device in the first domain, the first hello packet to the second device in the first domain comprises sending, by the first device in the first domain, the first hello packet to the second device in the first domain over an interconnection link that carries Layer 2 data traffic between the first device in the first domain and the second device in the first domain.

20. The non-transitory computer-readable medium of claim 18, wherein receiving, by the first device in the first domain, the second hello packet from the second device in the first domain comprises receiving, by the first device in the first domain, the second hello packet from the second device in the first domain over an interconnection link that carries Layer 2 data traffic between the first device in the first domain and the second device in the first domain.

\* \* \* \* \*